Aug. 21, 1928.  
A. M. BOVIER  
1,681,513  
COMPOSITE MANIFOLDING STRIP  
Filed Sept. 9, 1924
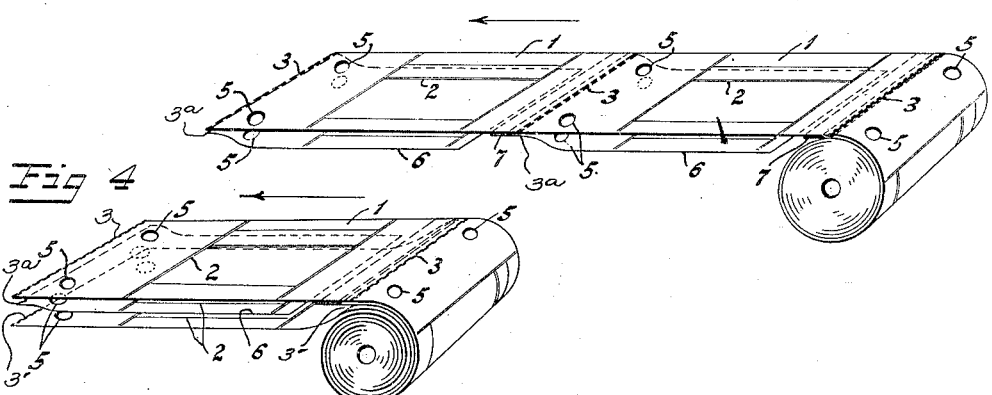
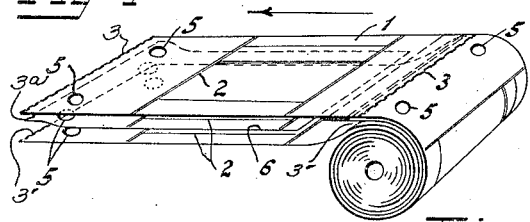
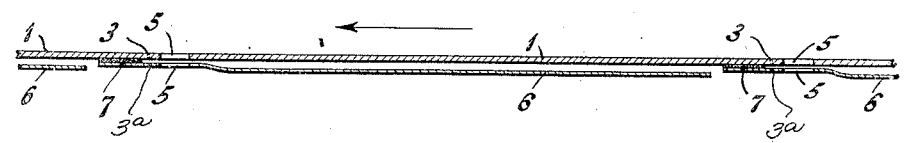
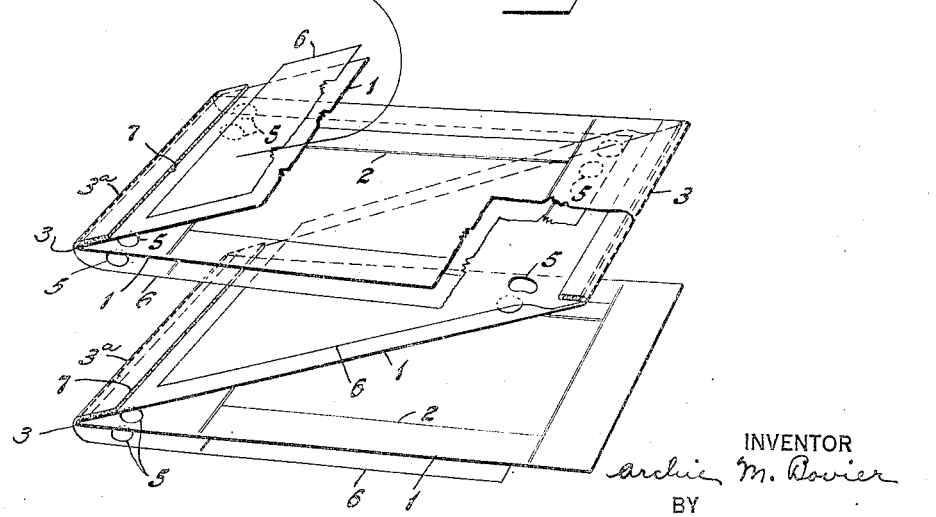
INVENTOR  
Archie M. Bovier  
BY  
Duell, Anderson & Duell  
ATTORNEYS Patented Aug. 21, 1928.

1,681,513

UNITED STATES PATENT OFFICE.

ARCHIE M. BOVIER, OF ELMIRA, NEW YORK, ASSIGNOR TO AMERICAN SALES BOOK COMPANY, LIMITED, OF TORONTO, ONTARIO, CANADA, A CORPORATION OF ONTARIO.

COMPOSITE MANIFOLDING STRIP.

Application filed September 9, 1924. Serial No. 736,686.

This invention relates to pads or manifolding strips adapted to be used for manifolding devices.

An object of this invention is to provide a device of the character described, in which a plurality of record forms may be assembled in compact and convenient manner.

A further object is to provide a pad having a plurality of sales record sheets so arranged that they may be manipulated as a continuous web, and they operate through a manifolding machine as a single strip but having the sales record so arranged as to provide a plurality of copies of each sales record.

A further object is to provide a plurality of sales records attached together to form a continuous strip to facilitate manipulation through a manifolding device and carrying a plurality of auxiliary record forms in constant registry with the record forms of the strip up to and including the time of severance from the strip.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Figure 1 is a perspective view showing a supply pad for manifolding machines in the form of a roll made in accordance with this invention, in which the various sales records are assembled in roll form;

Fig. 2 is a longitudinal section through the strip of Fig. 1;

Fig. 3 is a view of the strip as it may be assembled in zig-zag form; and

Fig. 4 is a modification.

Numeral 1 designates a strip of paper or the like on which are printed a plurality of successive sales record forms 2. A weakened line such as may be formed by perforations 3 may be provided between the successive adjacent sales forms to facilitate severance therebetween and to divide the record strip 1 into a succession of attached record areas or record leaves. A plurality of auxiliary sheets are attached to the sheet 1 in position to underlie the sales record forms respectively.

Each of the sales record strips is provided with form registering control apertures 5 in definite relation to the printed forms. To this end each auxiliary sheet 6 may be pasted or otherwise attached to the record strip as shown at 7 on a transverse line positioned in advance of the adjacent severance line 3 and in advance of the adjacent control apertures 5 which are located in the next successive record sheet. It will thus be seen that each auxiliary sheet 6 is attached to one of the record leaves and laps and underlies the adjacent severance line 3 and the adjacent control apertures, and that the main body thereof with free side and end edges laps said next successive record sheet. The main bodies of the auxiliary record sheets also extend in free trailing position close to the record strip 1, that is they trail backwardly along the advancing traveller record strip from the lines of attachment thereto. Also as shown, each auxiliary sheet 6 may be provided with a transverse line of perforations 3ª forming a severance line which lies substantially contiguous to the severance line 3 of the record strip enabling both the record strip and the auxiliary leaf to be severed at a single tearing operation.

As illustrated in Fig. 1, the strip 1 with its attached sheets 6 may be wound in the form of a roll, whereas as illustrated in Fig. 3, the strip may be folded zig-zag.

In this latter case the fold may be along the line of perforations so that each record sheet and each auxiliary sheet will lie flat in the package, while the folding assists the perforations to facilitate severance between the forms.

In use the strip is fed through the manifolding device, and each auxiliary sheet 6 is kept in registry with its corresponding strip sheet by reason of the attachment to the strip until it reaches the writing position. As soon however as the preceding form or record leaf of the strip 1 and the attached auxiliary leaf 6 are severed along the contiguous lines of severance formed by the perforations, the next succeeding auxiliary sheet is freed from the record strip. It would thus be seen that the strips are fed through the machine as a single unit, as easily as if but a single strip were being fed, whereas when the sales forms are issued from the machine, a plurality of separate forms issue.

This strip may be untilized in any one of many ways. The impression may be made on the auxiliary sheets by carbonizing the under surface of the strip sheets but for many purposes it is preferred to make the auxiliary sheets 6 of tissue which is relatively thin compared with the strip 1 and is translucent so as to permit an inscription on one side thereof to be read upon the opposite side. In this way records may be transferred to the auxiliary sheets by passing the combined strip over a transfer sheet having transfer material on the upper face thereof so as to contact with the under faces of the auxiliary sheets.

It will be obvious that each strip may have a plurality of auxiliary sheets attached to each form if desired and that a plurality of such strips may be assembled in a single pad in superposed relation. There is illustrated in Fig. 4, a pad in which a strip having one auxiliary leaf attached to each record leaf of the strip is assembled in pad formation with a strip having forms thereon without auxiliary sheets attached. This form of pad forms a useful embodiment of the invention whereby with a single transfer strip triplicate copies of a sales record may be made. The strip unprovided with the auxiliary sheet also has transverse severance lines 3' positioned for substantial alignment with the severance lines 3 and 3ª of the superposed main strip and auxiliary sheet. In all of the different forms of the invention it will be observed that the record leaves or sheets, as well as the sets of superposed record leaves formed by the main and auxiliary leaves, are consecutively arranged one following another in succession.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In combination, a traveler record strip having severance lines dividing it into a succession adjacent attached traveler record leaves and an auxiliary record leaf for each of said traveler leaves, said auxiliary leaves lapping the respective traveler leaves and forming therewith respectively adjacent attached sets of traveler leaves, each auxiliary record leaf being free from attachment to the respective lapping traveler leaf and having attachment to an adjacent advance traveler record leaf and extending rearwardly from its attachment across the adjacent line of severance each of said auxiliary record leaves having also a line of severance parallel and substantially contiguous to said first mentioned severance line whereby a traveler record leaf and its auxiliary leaf may be simultaneously severed along said contiguous severance lines, thereby freeing the auxiliary leaf from the traveler strip.

2. A traveler record strip having a succession of record leaves adapted to be fed forwardly with the traveling record strip to bring said leaves successively into inscription receiving position, and an auxiliary record leaf of translucent material for each said first mentioned record leaves arranged respectively in over-lapping relation therewith and forming therewith adjacent successive attached sets of record leaves, each of said auxiliary record leaves being attached to a preceding record leaf of the adjacent preceding set of leaves and having a free trailing end and free side edges, said record strip having transverse lines of severance between adjacent record leaves thereof and each of the auxiliary record leaves having a transverse line of severance contiguous to the strip line of severance for said next preceding leaf, and positioned rearwardly of the attachment of the auxiliary record leaf to the record strip.

3. A pad for manifolding record devices including, in combination, a plurality of adjacent successive sets of record leaves, certain of the leaves of each set being fastened together on transverse lines thereof and arranged in superposed registered position, certain of said fastened leaves of each set being attached end to end with a corresponding leaf of an adjacent set so as to form a succession of attached leaves each provided with a recording area and certain of the remaining said leaves of each set being attached end to end with a corresponding leaf of an adjacent set whereby a plurality of continuous lapped traveler record strips are formed, there being lines of perforation between said recording areas of said adjacent sets in the rear of the fastening between the leaves.

4. A pad for manifolding record devices including, in combination, a traveler strip having consecutively arranged traveler record leaves and having control apertures respectively positioned in definite relation with said leaves, and auxiliary record sheets in substantial registry respectively with said record leaves and attached on transverse lines thereof to said traveler strip in advance of the respective control apertures so as to travel forwardly with said traveler strip, said auxiliary record leaves also having control apertures aligning respectively with the traveler strip control apertures.

5. A pad for manifolding record devices including, in combination, a plurality of record leaves arranged in adjacent successive sets, the leaves of each set arranged in superposed relation and having respectively registering control apertures positioned in definite relation with said leaves, one leaf of each set being connected end to end with one leaf of each adjacent set to form a continuous traveler strip, certain of the leaves of each set having attachment with each other, the traveler strip having a line of severance between each two adjacent successive sets of record leaves and positioned in the rear of the respective said attachment, said control apertures being positioned in the rear of the respective lines of severance.

In testimony whereof I affix my signature.

ARCHIE M. BOVIER.